April 23, 1968   A. O. BARROWCLOUGH   3,378,953
AUTOMATIC GATE

Filed July 26, 1965   3 Sheets-Sheet 1

*Inventor*
ALAN OGILVY
BARROWCLOUGH
By Young & Thompson
*Attorneys*

Inventor
ALAN OGILVY BARROWCLOUGH
By Young & Thompson
Attorneys

United States Patent Office 3,378,953
Patented Apr. 23, 1968

3,378,953
AUTOMATIC GATE
Alan Ogilvy Barrowclough, Whitaker Place,
Auckland, Auckland, New Zealand
Filed July 26, 1965, Ser. No. 474,695
Claims priority, application New Zealand, Aug. 5, 1964,
139,014
4 Claims. (Cl. 49—364)

ABSTRACT OF THE DISCLOSURE

A vehicle-operated gate is in two relatively swinging sections. Pressure of the vehicle on a leaf spring unblocks the sections so that they can swing relative to each other and also stores energy to push the gate open, both in the pushed leaf spring and in a further leaf spring that interconnects the two sections and urges them toward uniplanar relationship. A hydraulic piston and cylinder regulate the opening swing of the gate and also hold the gate open for a fixed period before allowing the gate to swing closed by gravity.

---

This invention relates to gates and particularly to large gates such as used on farms and elsewhere, the objects of the present invention being the provision of an automatic gate which is opened on the approach of a motor vehicle from either side thereof and closes after passage of the vehicle, the gate being such as to not require the provision of any power supply or the like and also such that farm animals are unable to open it.

I am aware that there have been many known forms of automatic gate, with a considerable percentage of these electrically or power operated, it being an objection in many situations on farms to have to supply the electric power to gates and furthermore it is possible in some cases for the gates to be caused to be opened by farm animals.

The present invention has been devised to provide an automatic gate which in itself does not require the provision of an electrical or other source of power and which is such that farm animals are unable to cause it to open.

Broadly the invention comprises an automatic gate wherein same is adapted to be opened automatically by horizontal pressure of a vehicle against a mechanism mounted on or part of the gate proper, but incapable of being opened by livestock, being hingeably mounted on one post and secured when closed by latch means at another post, the two ends of the gate frame respectively that towards the hinge post and that towards the latch post being capable of spring resisted mutual angular deviation from their normal co-linearity in the vertical plane, such spring means acting simultaneously with a second spring means mounted on or part of the gate frame proper capable of resistively yielding to the horizontal linear thrust of a vehicle so that by dual co-operative action of the angular spring means and the linear spring means energy is acquired from vehicle pressure subsequently causing the gate to fly open by angular rotation about the post-mounted hinge means.

Figure 1:
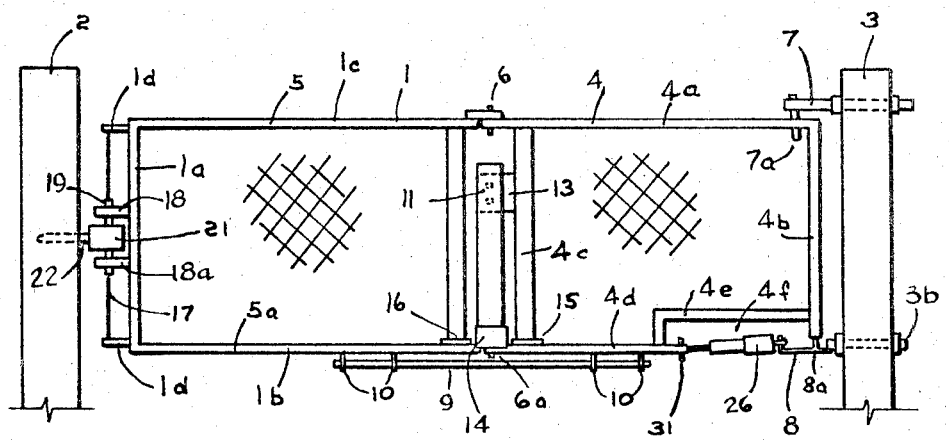
Figure 3:
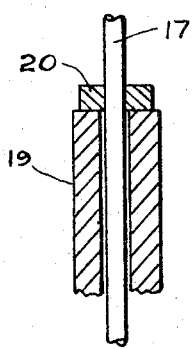
Figure 2:
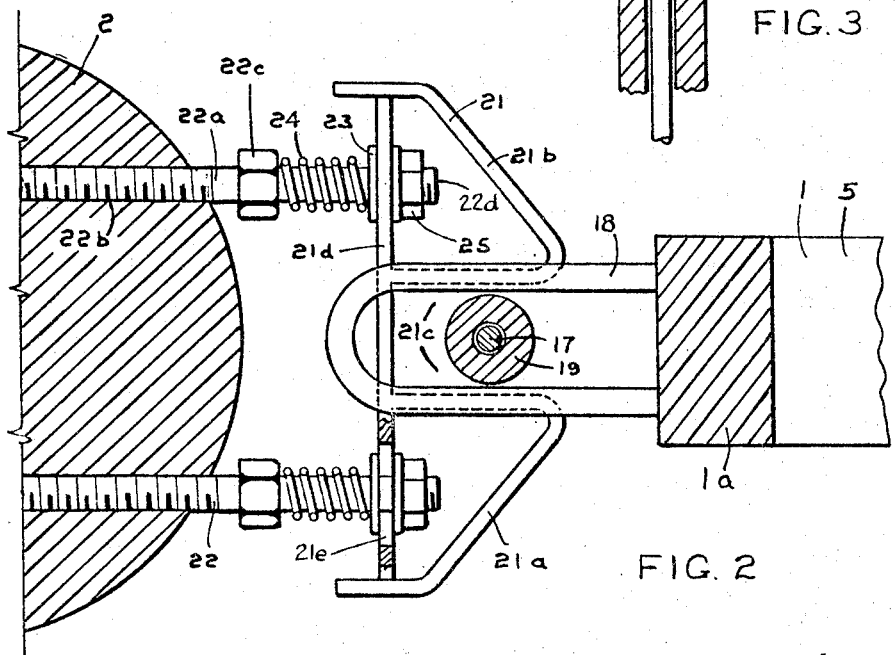
Figure 4:
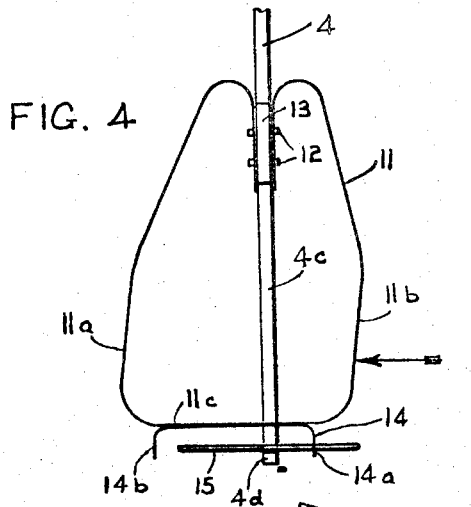
Figure 5:
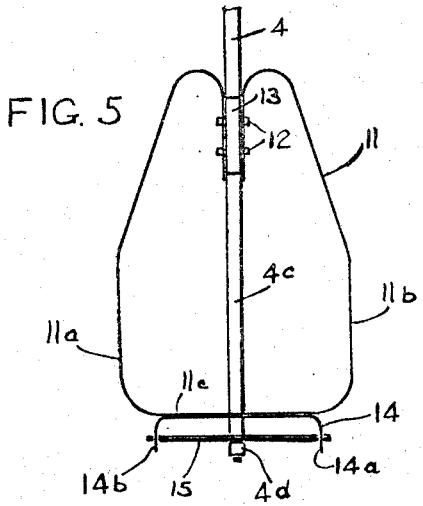
Figure 6:
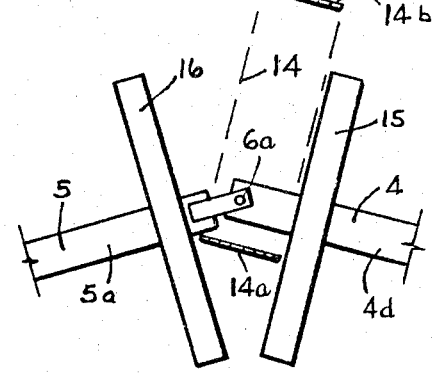

In describing the invention, reference will be made to the accompanying drawings in which:

FIGURE 1 shows an elevation of the gate in the closed position,

FIGURE 2 is an enlarged plan view of the latch means of the gate when the gate is closed, FIGURE 3 is an enlarged partial sectional elevation of the latch spring and latch roller, FIGURE 4 shows a side elevation of the loop spring when thrust is applied to a side thereof, FIGURE 5 shows a side elevation of the loop spring in normal relaxed position, FIGURE 6 shows a plan view of the gate lower edge when the loop spring has thrust applied thereto as shown in FIG. 4.

Figure 7:
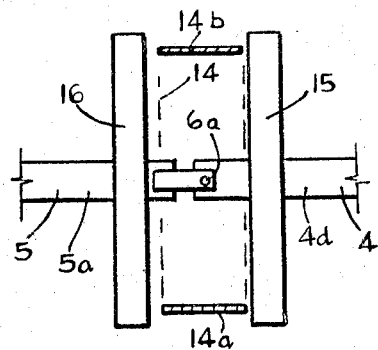
Figure 8:
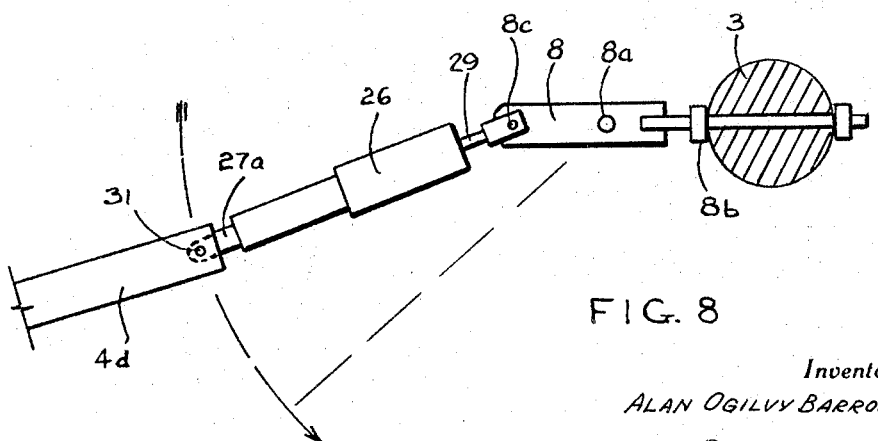
Figure 9:
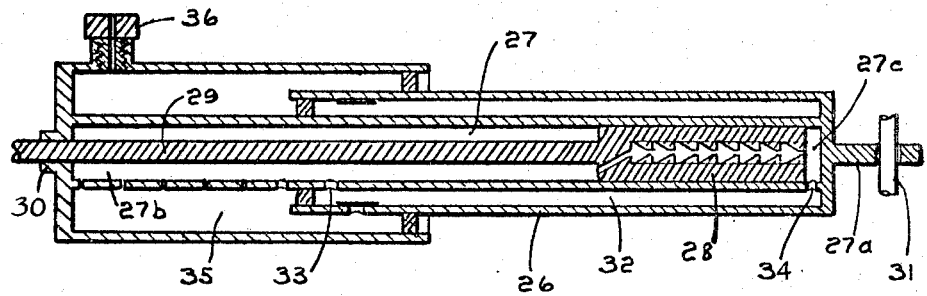
Figure 10:
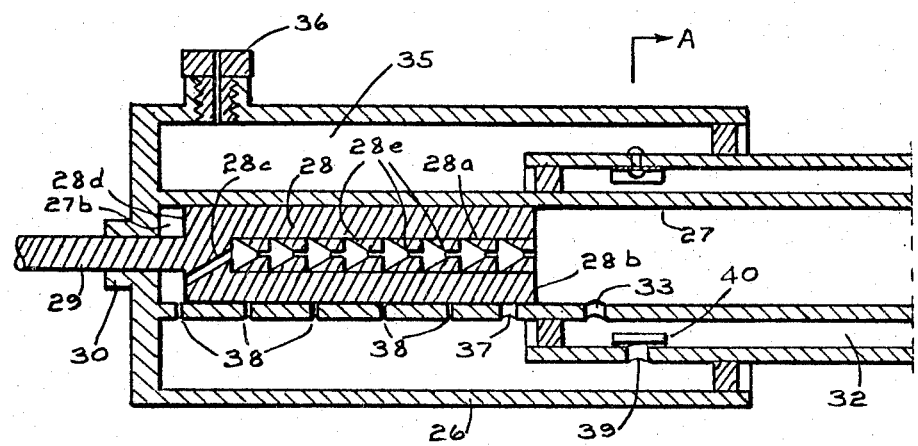
Figure 11:
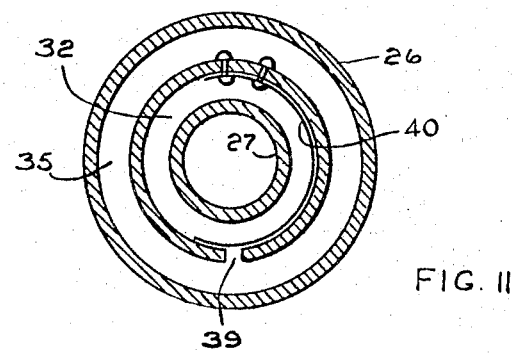

FIGURE 7 shows a similar view but with the gate lower edge in normal position,

FIGURE 8 is a plan view of the hydraulic damper mechanism connected between the lower bar of the gate and the gate post and with the gate moved to a partly opened position, FIGURE 9 is a sectional elevation of the hydraulic damper mechanism with piston and piston rod in inward position, FIGURE 10 is a partial enlarged sectional elevation of the hydraulic damper mechanism with piston and piston rod in outer position and FIGURE 11 is a sectional elevation on line A—A of FIG. 10.

In the invention, the gate 1 is essentially a rectangular frame such as of suitable bar metal construction extending between two gate posts 2 and 3, being hingeably mounted to one post 3 and the other post 2 having a portion of latch means thereon engageable by a further portion of the latch on the free or swinging end 1a of the gate 1.

The gate 1 is not however a continuous rigid structure from end to end, but is articulated or made up of two substantially equal lengths or sections, with these inner and outer gate sections 4 and 5 pivotally or hingeably connected together by upper and lower pivot pins or the like 6 and 6a, whereby in effect the two gate sections 4 and 5 can move or fold to out of alignment with each other such as shown in FIG. 6.

The gate 1 is hingeably or pivotally mounted to the gate post 3 so as to be carried thereby and swing thereon, there being an upper bolt 7 through the post 3 with a pivot or hinge pin 7a projecting therefrom to engage through a hole (not shown) in the top bar 4a of the gate section 4, such inner gate section 4 having a gate hinged edge or vertical end bar 4b thereto in the bottom of which there is a hole (not shown) into which a pivot or hinge pin 8a passes which forms a part of a bracket 8 secured to a lower bolt 8b passing through the gate post 3.

In the hingeable connection of the gate 1 to the post 3, the upper hinge pin 7a is so arranged as to be a greater distance from the post 3 than is the lower hinge pin 8a, whereby the axis of these two hinge pins lies in a plane of the gate 1 and at a small angle from the vertical, so that when the gate 1 is swung to an open position, it has swung upward to a slight degree so that it tends to gravitationally swing back from the open position to a closed position.

Disposed under the bottom edge 1b of the gate 1 in the vicinity of the centre of the length of same, there is a straight heavy spring rod or spring bar 9 (see FIG. 1) and this is supported in suitable bearings 10 secured to the bottom edge 1b so that it is free to effect some slight longitudinal travel and as this bar spring 9 extends across the middle hingeably connected position of the two gate sections 4 and 5, it yieldingly resists any movement of the gate sections 4 and 5 to out of alignment with each other.

If so desired, a further similar heavy spring rod may be applied to along the top edge 1c of the gate 1, the spring rod or rods being main items for causing opening actuation of the gate 1.

Obviously, as a further alternative, the two gate sections 4 and 5 may not be hingeably connected together but may be connected by flexible spring pieces rigidly or otherwise attached to each gate section 4 and 5, such spring pieces providing the effect of a hinge while also serving to yieldingly hold the two gate sections 4 and 5 colinear. Yet further as an alternative means of construction the whole gate 1 may obviously be made of spring material so that the gate is enabled to bow in the centre while maintaining a tendency to regain a linear shape.

In the central position on the gate 1 and preferably secured to the outer end bar 4c of the inner gate section 4 there is a mechanism which will be called a "bumper actuated mechanism," this comprising a large loop spring 11 (see FIGS. 4 and 5) disposed at right angles in relation to the gate 1, the two ends of the loop spring being rigidly secured to a block or like extension 13 of the end bar 4c by bolts 12, said loop spring 11 having its normally vertical side parts 11a and 11b (see FIG. 5) projecting equally to opposite sides of the gate 1.

Of course the configuration of a loop is not essential for the bumper actuated mechanism, which is merely required to yieldingly resist lateral pressure, as from the bumper of a vehicle, while transferring such pressure through its mountings to the gate 1 and at the same time to carry the laterally movable stops 14a and 14b.

Secured to the bottom horizontal portion 11c of the loop spring 11 there is a stop bar 14 which presents at its opposite ends downwardly extending stops 14a and 14b (see FIGS. 4 and 5) and with the gate 1 in normal position as shown in FIG. 5, these stops 14a and 14b are located (with only small clearance) between pinching bars 15 and 16 which are secured respectively to the bottom bar 4d of the inner gate section 4 and the bottom bar 5a of the outer gate section 5, these pinching bars 15 and 16 being horizontal, at right angles to the gate 1 and projecting equally to opposite sides thereof.

At the free swinging edge 1a of the gate 1 on the gate section 5 and also on the gate post 2 there is the latch means, there being a vertical latch spring or spring rod 17 secured at its ends to lugs 1d extending from the edge 1a of the gate 1 at or near the top and bottom thereof and passing through a pair of U-shaped guide pieces 18 and 18a which are spaced apart one above the other and are rigidly secured to the gate edge 1a, there being a latch roller 19 (see FIG. 3) rotatably mounted on the spring rod 17 and held against axial travel as by upper and lower collars or the like 20, the roller 19 being adapted for travel within the guide pieces 18 and 18a, towards and away from the gate 1 from its intermediate position when the spring rod 17 is at rest.

Mounted on the gate post 2 there is the complementary part of the latch means (see FIG. 2) comprising a latch plate 21 having two ramp like contact faces 21a and 21b spaced apart with a vertical latch slot 21c between into which the vertical latch roller 19 is adapted to be projected by the action of the latch spring rod 17.

The latch plate 21 is spring mounted to the gate post 2, being mounted thereto by having a back plate portion 21d with two horizontally slotted holes 21e through which two spaced apart bolts 22 and 22a secure it to the post 2, these bolts 22 and 22a being screw threaded or the like 22b by which they are screwed into the post 2 and having collar parts 22c. Washers 23 and compression springs 24 are fitted so that when the nuts 25 are tightened to the required extent the compression springs 24 maintain a permanent constant pressure against the back plate 21d. The latch plate 21 can then effect some travel horizontally in a direction transverse to the plane of the gate 1 in its closed position. Such travel is restrained by friction between the washers 23 and the back plate 21d, due to the pressure of the compression springs 24.

The ramp surfaces 21a and 21b of the latch plate 21 are directed outwardly to opposite sides of the post 2 so that the latch roller 19 can pass over one of same in passing to the slot 21c, when the gate 1 is being closed in directions from either side.

Disposed between the gate 1 near its hinged edge 4b and the post 3 to which it is hinged there is mechanism of a type which is generally known as a "dashpot," being mainly composed of a piston and cylinder with orifices through which a hydraulic fluid can pass to by-pass the piston, whereby restraint on the movements of the parts to which the dashpot are mounted are imposed.

In the present invention there is a dashpot or a hydraulic damper mechanism 26 which has special features as providing for variability of the restraint it imposes on the movements of the gate 1.

To provide a suitable location for the hydraulic damper mechanism 26, the bottom bar 4d of the inner gate section 4 ends before reaching the gate hinged edge or vertical bar 4b, connection being effected between these parts by a right angle bent bar 4e to thereby provide a recess 4f for the damper 26.

The inner end of the bottom bar 4d extends a short distance into the recess 4f, the bracket 8 also extending into the recess 4f and in between these parts the hydraulic damper 26 is mounted.

The hydraulic damper 26 comprises a cylinder 27 with a piston 28 therein from which a piston rod 29 extends to pass through a gland 30 at one end of the cylinder 27, the piston rod 29 being pivotally secured at its outer end by a pivot pin 8c fastened to the bracket 8 (see FIG. 8) the other end of the cylinder 27 having a lug or the like 27a whereby it is pivotally secured by a pivot pin or the like 31 secured to the end of the bottom bar 4d of the gate section 4, the piston rod 29 being in an inward position as shown in FIG. 9 when the gate 1 is closed and in an outward position as shown in FIG. 10 when the gate is opened, this being due to the fact, as indicated by the dotted lines in FIG. 8, that the gate 1 swings about the pivot 8a, while the damper 26 swings about the pivot 8c which is further from the post 3.

To distinguish the ends of the cylinder 27 from each other, the end having the gland 30 is called the gland end 27b and the end having the lug 27a called the lug end 27c of the cylinder 27.

The piston 28 has an axial passage 28a therein extending from its outer end 28b, there being a series of jets 28e fitted within this passage, an escape orifice 28c being provided through the inner or rod end 28d of the piston 28 connected to such axial passage 28a.

Around the lug end 27c of the cylinder 27 there is an annular by-pass space 32 and this is connected at its opposite ends to the cylinder 27 by main ports or holes 33 and 34.

Around the gland end part 27b of the cylinder 27 and also around an inner end part of the annular by-pass space 32 there extends an annular reservoir 35 which includes a filler and air vent plug 36.

At suitable intervals apart along the cylinder 27 towards the gland end 27b thereof there is one large port 37 and a number of small holes or ports 38 through the cylinder 27 opening into the annular reservoir 35 and between the annular by-pass space 32 and the reservoir 35 there is a large port 39 which is a one-way passage as being covered by a reed valve 40, the whole of the hydraulic damper mechanism 26 being filled with a suitable hydraulic fluid.

In use or operation, a motor vehicle on approaching the closed gate 1 from either side thereof is required to slow down to a crawl or stop until its bumper comes into contact with the loop spring 11 at the middle of the gate (such as the sidepart 11b as shown in FIG. 4) the vehicle then pushing the loop spring 11 forward so that such push is imparted to the gate 1 itself through the spring 11 and because of the gate being composed of two hinged sections 4 and 5, these are pushed out of alignment or slightly folded forwardly, as being held at their outer ends by hinges on one post 3 and the latch means to the other post 2.

With the vehicle pushing against the loop spring 11 and thereby causing its deflection and slight folding of the gate 1, the bar spring 9 is also progressively and simultaneously caused to bend, whereby as the slight folding of the gate 1 is increased (such as shown in FIG. 6) this is gradually causing the latch roller 19 to travel outwardly from the latch slot 21c in the latch plate 21 on the gate post 2, until finally the latch roller 19 is moved to clear of the slot 21c whereby the free end 1a of the gate 1 is released.

A feature of the latch means wherein it differs from known latch means is in the provision for outward travel of the latch roller 19 relative to the free swinging end 1a of the gate frame immediately prior to release of the latch means. This provision is additional to the known means of allowing inward travel, on gate closing only, of a portion of latch means fitted on the end of a gate.

In such known means of latch construction wherein during the opening phase of the gate, the gate mounted portion of the latch is immobile relative to the free end of the gate, the available travel, due to folding movement of the gate frame 1, of the end 1a towards the post 3 is merely equal to the projection of the gate mounted latch portion into the slot 21c of the post mounted portion. In the invention herein described such available travel of the end 1a towards the post 3 is double the projection of the latch roller 19 into the slot 21c enabling the development of adequate folding movement of the gate frame 1 before latch release, with latch means of compact, non-wearing and inexpensive construction.

When at rest with the gate closed, the latch roller 19 is located at an intermediate position in its travel within the guide pieces 18 and 18a. When bumper pressure is applied to the gate the latch roller 19 is nipped between the lateral pressure of the guide pieces 18 and 18a and the opposing reaction of one face of the latch slot 21c. As folding action of the gate frame 1 causes the guide pieces 18 and 18a to then move horizontally away from the post 2 the latch roller 19 is compelled to roll over the surfaces it bears against, overcoming the lateral restraint of the spring rod 17. The latch roller 19 thus rolls away from the free end 1a of the gate simultaneously as it rolls away from the post 2 so that the travel of the end 1a of the gate is double the travel of the latch roller 19 out of the slot 21c. By rolling rather than sliding the wear in service of the latch roller 19 is minimised.

On release of the free end 1a of the gate 1, the gate swings open smartly, being thrust away from the bumper of the vehicle to fly to open position, the springs 9 and 11 being freed to move back to relaxed position and the gate sections 4 and 5 returning to positions of alignment with each other.

At this stage it is appropriate to describe the unique advantage possessed by the gate due to its slight folding action and the provision of dual energy absorbing means, namely the loop spring 11 and the bar spring 9.

In any gate of rigid construction which accumulates spring energy, preparatory to opening, from forward movement of a vehicle bumper against any mechanism mounted on the gate proper it is necessary that the mechanism contacting the bumper shall initially project sideways from the gate frame to an excessive and inconvenient extent. Consequently the gate as a whole cannot be compact, robust and of attractive appearance.

The reason for such substantial sideways projection of the bumper contact mechanism is that it is necessary, within the limits of available bumper force, to ensure that the force is applied through a substantial distance in its direction of action to provide sufficient energy which is stored in the spring means, for satisfactory operation of the gate. The bumper contact mechanism must then initially project substantially from the rigid frame of the gate so that during its contact with the advancing vehicle bumper it can travel a substantial distance towards the frame.

In the invention herein described the movement, during bumper contact, of the loop spring 11 relative to the gate may be small as the travel of the vehicle bumper is greatly augmented by simultaneous displacement of the middle of the gate as it folds slightly. The initial projection of the loop spring 11 to either side of the gate frame may then be small so that the mechanism as a whole is compact, robust and attractive.

It has been found that given suitable proportions between the stiffnesses of the dual spring means 9 and 11 and suitable disposition of masses in the gate, the stored spring energy at the moment of latch release is converted into useful angular opening movement of the gate frame 1 as a whole, the two sections 4 and 5 becoming substantially colinear, and that remarkably little energy is dissipated in useless oscillatory folding movements.

This swing of the gate 1 in opening direction is preferably in excess of 90 degrees from the closed position, the opening swing of the gate causing same to effect rise at its free end 1a, whereby at the end of its opening movement, it has in effect stored up a degree of energy (gravitational action) which will tend to cause it to move back to the closed position.

The operation so far described has not however taken into account the dashpot or hydraulic damper mechanism 26, the opening swing of the gate 1 having caused the piston rod 29 to have moved outwardly from the cylinder 27 so that the piston 28 has also moved towards the gland end 27b of the cylinder 27 and to have done this, hydraulic fluid has had to pass from one end of the cylinder 27 to the other.

In the initial stages of the opening swing of the gate 1, the piston 28 has a substantial freedom of movement with the fluid free to flow between opposite ends of the cylinder 27 by way of the main ports 33 and 34 and the annular by-pass space 32, but as the gate 1 is approaching its fully opened position, the piston 28 travel first causes it to cover main port 33, then port 37 and then one after another of the succession of small ports 38, so that increasing resistance is imposed on the flow of fluid and on the travel of the piston 28 whereby this increasing restraint is also imposed on the movement of the gate 1 so that it is finally brought to a stop in the fully opened position. By this means the opening movement of the gate 1 is checked even if the movement is excessively violent as may result if a careless driver allows his vehicle bumper to contact the mechanism at more than a crawling speed.

During the opening movements of the gate 1, the fluid has been flowing from the gland end 27b of the cylinder 27 to its lug end 27c or substantially so, this being permitted by the fluid flowing from the reservoir 35 freely past the reed valve 40 into the annular by-pass space 32 and into the lug end 27c of the cylinder 27 by way of the main port 34.

The gate 1 then gradually moves in gravitationally caused manner towards the closed position, very slowly at the start, but effecting an increase in speed towards the end of the closing movement under the control of the hydraulic damper 26, so that it finally slams shut, with the latch roller 19 re-entered to the latch slot 21c of the latch plate 21 on the gate post 2.

In the closing movement of the gate 1, the piston 28 commences to move back towards the lug end 27c of the cylinder 27 so that the fluid is required to flow away from such lug end 27c of the cylinder 27, such flow being by way of the succession of jets 28e in the axial passage 28a and the escape orifice 28c of the piston 28, the reed valve 40 being closed against flow from the lug end 27c of the cylinder 27 and the annular space 32 through the port 39 into the reservoir 35.

As the piston 28 moves towards the lug end 27c of the cylinder 27 its motion is greatly impeded by the resistance to flow of the jets 28e until the piston 28 lies wholly between holes 33 and 34 when resistance ceases as flow is possible through the annular by-pass space 32.

If a pedestrian desired to open the gate 1, this is simply effected by pushing the latch roller 19 out of the latch slot 21c to thereby release the gate 1 for opening in normal manner, the gate being provided if so desired, with any known suitable means to enable it to be held in open position (not shown).

To open the gate 1, the loop spring 11 has to be pushed in a low down position thereon such as the normal level of the bumper of a motor vehicle and as indicated by the arrow in FIG. 4, and while large farm animals such as cows can apply ample pressure against the loop spring 11, this pressure would be applied by the animal higher up the spring 11 at which location the application of pressure would not achieve the required amount of movement which is to bring the spring 11 to substantially the position as shown in FIGS. 4 and 6 in which the stop 14b has moved to a position which is outward from the ends of the pinching bars 15 and 16 and the stop 14a moved to an inward position at which it does not present an obstacle to the movements of such pinching bars 15 and 16.

If the pressure is applied against the upper part of the loop spring 11, the spring 11 will not be able to move so far forward as is required to cause the stops 14a and 14b to be clear of the pinching bars 15 and 16 and while the gate 1 will fold forward to some extent, such folding will be checked because of the pinching bars 15 and 16 effecting pinching action one one of the stops 14a or 14b of the loop spring 11, so that these would present a rigid restraint to the folding action of the gate sections 4 and 5 and thereby prevent the latch roller 19 from getting to the released position.

While smaller animals such as sheep may apply pressure to the loop spring 11 at motor vehicle bumper level, they would not be able to apply sufficient thrust to cause the loop spring 11 to move the required distance to cause the gate to open. It is clear that by pushing against the frame 1 of the gate stock are unable to effect opening because of the pinching action on the stops 14a or 14b.

The description of the operation of the latch means given in the foregoing paragraphs has not taken into account the provision for the absorption of shock on closing of the gate afforded by the facility for frictionally restrained horizontal movement of the latch plate 21 on the bolts 22 and 22a.

Immediately prior to opening of the gate by vehicle action the horizontal bumper pressure, transferred through the frame 1, the guide pieces 18 and 18a and the latch roller to either one of the contact faces 21a or 21b, causes the latch plate 21 to slide horizontally to the limit of its freedom for movement afforded by the slotted holes 21e through which the bolts 22 and 22a pass. In doing so the friction between the washers 23 and the back plate 21d is overcome. On subsequent closing of the gate the latch roller 19 on entering the latch slot 21c strikes one of the contact faces 21a or 21b and causes the latch plate 21 to move horizontally as permitted by the slotted holes 21e in the black plate 21d. The said frictional restraint to this movement causes the slamming motion of the gate frame 1 to be checked gradually rather than instantaneously so that excessive shock is not transmitted to the post 2. By this means the post 2 is protected from becoming loose in the ground.

I claim:

1. An automatic gate adapted to be opened automatically by horizontal pressure of a vehicle against a mechanism carried by the gate, said gate being hingedly mounted on one post and secured when closed by latch means at another post, said gate having a frame in two portions that are swingable relative to each other in a horizontal direction, first spring means for urging said two portions into coplanar relationship in a vertical plane, second spring means carried by the gate for resistantly yielding to the horizontal thrust of a vehicle so that by the cooperative action of said first and second spring means energy is acquired from vehicle pressure subsequently causing the two portions of the gate frame to swing into coplanar relationship while simultaneously the gate as a whole flies open by angular rotation on said one post, said latch means by which the free-swinging edge of the gate is fastened to said another post comprising an upright spring member secured at its ends adjacent the top and bottom of the free-swinging edge of the gate, a latch roller rotatably mounted on the spring member free to move both outward from and inward toward the free-swinging edge of the gate, a pair of spaced guide members secured to and extending outwardly from said edge of the gate with said spring member and latch roller passing through said guide members, a latch plate having two spaced ramp-like contact faces with a vertical latch slot between, and means for securing said latch plate to said another post.

2. An automatic gate as claimed in claim 1, said securing means comprising two spaced bolts having screw threads by which they are screwed into said another post, said bolts passing through slotted holes in the latch plate, each bolt having collar parts and nuts and washers thereon and having compression springs thereon acting between the collar parts and said washers to apply pressure against the latch plate, said washers encompassing the bolts on opposite sides of said slotted holes in the latch plate and said nuts maintaining the washers on the bolts.

3. An automatic gate adapted to be opened automatically by horizontal pressure of a vehicle against a mechanism carried by the gate, said gate being hingedly mounted on one post and secured when closed by latch means at another post, said gate having a frame in two portions that are swingable relative to each other in a horizontal direction, first spring means for urging said two portions into coplanar relationship in a vertical plane, second spring means carried by the gate for resistantly yielding to the horizontal thrust of a vehicle so that by the cooperative action of said first and second spring means energy is acquired from vehicle pressure subsequently causing the two portions of the gate frame to swing into coplanar relationship while simultaneously the gate as a whole flies open by angular rotation on said one post, pinching bars secured to the bottom of each gate frame portion at right angles thereto and projecting on opposite sides of each gate frame portion, said second spring means comprising a loop spring disposed at right angles to the gate with the two ends of the loop spring secured to an upper portion of the gate and the loop spring projecting equally on opposite sides of the gate with its lower part free to be thrust away from normal position by the vehicle, and stop members extending downwardly from a lower portion of the loop spring, said stop members being disposed between said pinching bars on opposite sides of said gate frame portions.

4. An automatic gate adapted to be opened automatically by horizontal pressure of a vehicle against a mechanism carried by the gate, said gate being hingedly mounted on one post and secured when closed by latch means at another post, said gate having a frame in two portions that are swingable relative to each other in a horizontal direction, first spring means for urging said two portions into coplanar relationship in a vertical plane, second spring means carried by the gate for resiliently yielding to the horizontal thrust of a vehicle so that by the cooperative action of said first and second spring means energy is acquired from vehicle pressure subsequently causing the two portions of the gate frame to swing into coplanar relationship while simultaneously the gate as a whole flies open by angular rotation on said one post, said first spring means comprising an elongated spring member extending across between the two gate frame portions, and bearings secured to said gate frame portions and in which said elongated spring member is supported.

References Cited

UNITED STATES PATENTS

| | | | |
|---|---|---|---|
| 1,132,792 | 3/1915 | Page | 160—328 |
| 1,231,763 | 7/1917 | Loprete | 49—9 X |
| 2,593,379 | 4/1952 | Wueste | 49—386 |
| 2,594,033 | 4/1952 | Kemp | 49—364 X |
| 2,691,836 | 10/1954 | David | 292—341.17 X |
| 2,693,653 | 11/1954 | Dean | 49—364 X |
| 2,786,289 | 3/1957 | Koch | 49—364 |
| 3,044,764 | 7/1962 | Bonner | 49—30 |

FOREIGN PATENTS

| | | |
|---|---|---|
| 211,965 | 7/1909 | Germany. |
| 813,693 | 9/1951 | Germany. |
| 66,146 | 4/1943 | Norway. |

DAVID J. WILLIAMOWSKY, *Primary Examiner.*

HARRISON R. MOSELEY, DENNIS L. TAYLOR,
*Examiners.*